United States Patent
Berman et al.

(10) Patent No.: US 6,934,066 B2
(45) Date of Patent: Aug. 23, 2005

(54) METHOD AND APPARATUS FOR USE AND CONSTRUCTION OF COMPENSATED HIGHER ORDER WAVEPLATES

(75) Inventors: Arthur Berman, San Jose, CA (US); Ying-Moh Liu, Saratoga, CA (US)

(73) Assignee: LightMaster Systems, Inc., Santa Clara, CA (US)

( * ) Notice: Subject to any disclaimer, the term of this patent is extended or adjusted under 35 U.S.C. 154(b) by 0 days.

(21) Appl. No.: 10/371,835

(22) Filed: Feb. 20, 2003

(65) Prior Publication Data

US 2004/0165247 A1 Aug. 26, 2004

(51) Int. Cl.⁷ .......................... G02F 1/07; G02F 1/1335
(52) U.S. Cl. ...................... 359/256; 359/245; 359/246; 349/117; 349/102
(58) Field of Search .................. 359/256, 246, 359/245, 240, 238, 259; 349/117, 102, 113, 96

(56) References Cited

U.S. PATENT DOCUMENTS

| | | | | |
|---|---|---|---|---|
| 4,772,104 A | * | 9/1988 | Buhrer | ........................ 359/497 |
| 5,212,743 A | * | 5/1993 | Heismann | ..................... 385/11 |
| 6,717,706 B2 | | 4/2004 | Miller et al. | ................. 359/237 |
| 2001/0014069 A1 | * | 8/2001 | Vrehen | ..................... 369/53.28 |
| 2002/0001135 A1 | | 1/2002 | Berman et al. | ............. 359/640 |
| 2003/0016445 A1 | * | 1/2003 | Kelly et al. | .................. 359/464 |
| 2003/0103171 A1 | | 6/2003 | Hall, Jr. et al. | ................. 349/5 |
| 2004/0095536 A1 | * | 5/2004 | Yoshida et al. | ............. 349/117 |

OTHER PUBLICATIONS

International Search Report for PCT/US04/09693 dated Nov. 26, 2004.

* cited by examiner

*Primary Examiner*—Timothy Thompson
(74) *Attorney, Agent, or Firm*—Reed Smith LLP; John W. Carpenter (57) ABSTRACT

A compensated higher order waveplate is constructed of substrates. In one embodiment, a first substrate is a nλ waveplate and the second substrate is a (n+Δ)λ waveplate. The substrates are oriented so that their principle axes of retardation are orthogonal. nλ is a base retardation of a waveplate and Δλ is an incremental retardation. The incremental retardation produces a desired amount of retardation of a lightwave passing through the compensated higher order waveplate. Retarder material used to produce the base retardation is approximately ½ a desired thickness of the waveplate. Multiple waveplates are combined to produce any of wavelength band specific retarders and multiple non contiguous wavelength band specific retarders.

82 Claims, 4 Drawing Sheets

FIG. 1

Substrates are made of quartz
Arrows mark the fast or slow optical axis
Thickness of substrate #1 is 40 lambda.
Thickness of substrate #2 is 40 1/4 lambda.

METHOD AND APPARATUS FOR USE AND CONSTRUCTION OF COMPENSATED HIGHER ORDER WAVEPLATES

BACKGROUND OF THE INVENTION

1. Field of Invention

The inventions disclosed in this document relate to waveplates. More specifically, to the material/construction of waveplates used in LCoS based, quad type kernels. Kernels are the heart of light engines such as those used for video projection.

2. Discussion of Background

Figure 1:
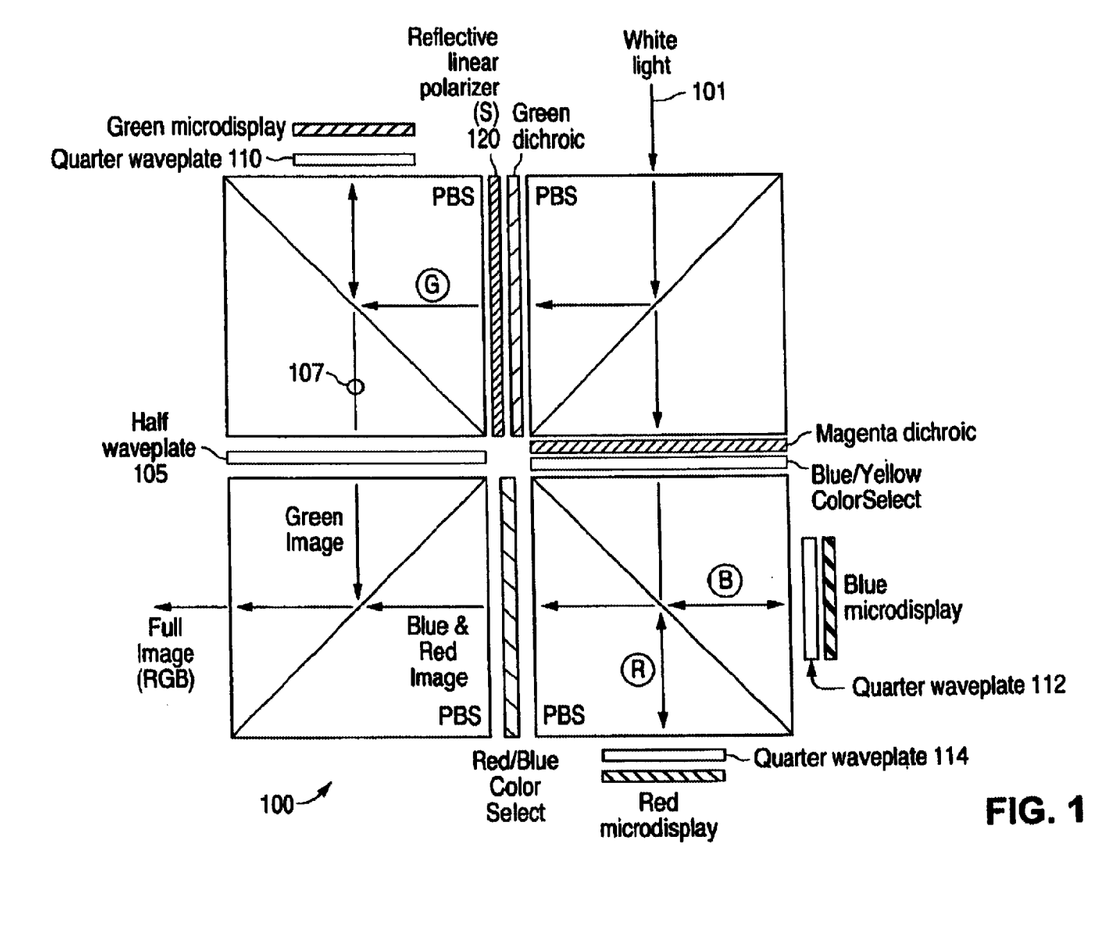
FIG. 1 is a diagram of a quad style LCoS based kernel that converts white light into a full RGB image.

In the context of LCoS based kernels such as those used in light engines for video projection, waveplates are used is several different ways. For example, skew ray compensating the light rays from PBSs and residual retardation compensation in high voltage state microdisplays. Their use can be illustrated with respect to the quad style kernel 100 illustrated in FIG. #1. White light 101 is split into Red (R), Green (G), and Blue (B) light beams that are directed to corresponding colored microdisplays with the correspondingly colored video information (e.g., red light beams, directed to red microdisplays that contain red video information, green to green, etc.) in the kernel 100. Light beams reflected off the microdisplays are then combined to produce a full image. In this example, the (R) and (B) reflected light beams are combined to form the Red & Blue Image, and then the (G) image, (G) reflected light beam, is further combined with the Red & Blue Image to produce the Full Image (RGB). Waveplates (e.g., ¼ waveplates 110, 112, and 114) are inserted at each microdisplay to perform skew ray compensation (more perfectly linearly polarizing light emitted from the PBS components) and residual retardation compensation.

A half waveplate 105 is used to rotate a linear polarized image 107 containing green light by 90°. Other waveplates may be utilized in this and other kernel and/or prism assembly designs.

In current generation kernels, and other devices using waveplates, waveplates are typically made from a plastic material such as polycarbonate. The use of any plastic material presents several practical problems.

For example, some plastic waveplates are physically too thin. This makes it difficult to handle the material during the kernel assembly process. Some plastic waveplates are physically too thick. Quite often, such material is not adequately flat thus introducing phase distortion.

Available plastic waveplates of the appropriate physical dimensions and quality are of limited supply and therefore economically not suitable.

Note that the quarter waveplates (e.g., 110, 112, and 114) are used in positions close to a corresponding microdisplay (near a focal plane of the kernel). Any material near the focal plane needs to be free of included and surface defects. In an application of the kernel 100 in a projection TV, an image on the microdisplay is magnified many times (~50x+), and even microscopic inclusions or other defects in any of the waveplates 110, 112 and 114 are readily visible in the full image. Plastic waveplates of this quality are not readily available or, again, are very expensive. Also note that all the problems and difficulties discussed herein can occur on applications other than televisions or projection devices.

Plastic waveplates are typically formed by a stretching process. Utilizing this means, it is difficult to produce waveplates with a specific retardation value. It is also difficult to produce a waveplate in which the retardation is uniform across the entire area of the waveplate.

One potential means to address these problems is to use a birefringent crystal as the waveplate. Possibly, the best candidate material is quartz.

The process of making a waveplate generally comprises making a thickness of a retarder material with a proper optical pathlength. For quartz, this requires orienting a piece of quartz with its crystal axis lined up in the correct direction and cutting the quartz to the correct thickness. However, a quarter wavelength piece of quartz has a thickness on the order of a few thousandths of an inch thick, which is generally unsuitable for many forms of mass production of items using the quarter waveplates. Therefore, quartz is suitable in many regards, but the thickness of a quarter or half waveplate is too thin for practical handling.

Wavelength specific retarders used in the industry today are typically constructed of layers of 1st order retarder components. For example, waveplates of various values are representative of the basic components of known wavelength specific retarders. The retarder components are made from materials such as polycarbonate or plastic.

SUMMARY OF THE INVENTION

The present inventors have realized the need for high quality waveplates for use in light engine kernels and other applications, particularly video projection devices. The present inventors have realized that the use of retarder materials, such as quartz, or mica, may be utilized in a way that provides not only the benefits of a high quality waveplate, but may also be configured to provide a waveplate in dimensions that are suitable for production of kernels and other devices without the use of sophisticated production techniques needed for very thin waveplates.

In one embodiment, the present invention provides a compensated higher order waveplate, comprising, a first substrate material having a principle retardation axis, and a second substrate material also having a principle retardation axis. The second substrate material is positioned such that the principle retardation axis of the second substrate is perpendicular to the principle retardation axis of the first substrate. Preferably, the first substrate is affixed to the second substrate using an optical adhesive, and at least one of the first and second substrates are constructed of quartz. In another embodiment, the first substrate is a $n\lambda$ waveplate (a substrate with a $n\lambda$ retardation value) and the second substrate is a $(n+\Delta)\lambda$ waveplate (a substrate with a $(n+\Delta)\lambda$ retardation value), wherein $n\lambda$ is a base retardation of a waveplate and $\Delta\lambda$ is an incremental retardation. The incremental retardation produces a desired amount of retardation of a lightwave passing through the compensated higher order waveplate. And, the thickness of the waveplate (substrate/retarder material) that produces the base retardation is approximately ½ a desired thickness of the compensated higher order waveplate. The desired amount of retardation is targeted to a specific wavelength (target wavelength $\lambda$), such that the desired amount of retardation occurs most precisely at the targeted wavelength $\lambda$ (e.g., a red, blue, or green wavelength). The waveplate is higher order because each of the substrates have a thickness that produces greater than $1\lambda$ retardation (e.g., a waveplate having a target wavelength of 950 nm has substrates larger than required for a lightwave at 950 nm to be retarded more than one wavelength). The waveplate is compensated because a net effect of the base retardation is zero.

The present invention includes a method of constructing a compensated higher order waveplate, including the steps of, selecting first and second substrates that optically combine to produce a desired waveplate, positioning the first substrate in relation to the second substrate such that a retardation axis of the first substrate is perpendicular to a corresponding retardation axis of the second substrate. The method may also include the step of securing the position of the first substrate relative to the second substrate, which may be performed, for example, by applying adhesive to the substrates and/or fitting a frame to the substrates with an air or liquid filled gap between the substrates.

Compensated higher order waveplates according to the present invention are preferably constructed to specifically target each of green, blue, and red light wavelengths (e.g., a green quarter waveplate, a blue quarter waveplate, and a red quarter waveplate). The compensated higher order waveplates are then utilized in a kernel (e.g., substituting quarter waveplate 110 with a compensated higher order green waveplate, substituting quarter waveplate 112 with a compensated higher order blue quarter waveplate, and substituting quarter waveplate 114 with a compensated higher order red waveplate replacing quarter waveplate 114).

In other embodiments, compensated higher order waveplates are combined at various orientations to produce wavelength band specific retarders that rotate polarization of specific wavelength bands of input linearly polarized light without disturbing the polarization of other bands of the input light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention provides a compensated higher order waveplate constructed to produce a desired retardation at a desired wavelength. Preferably, the compensated higher order waveplate is constructed of quartz, but other materials having similar optical properties may be substituted (e.g., mica).

Figure 2:
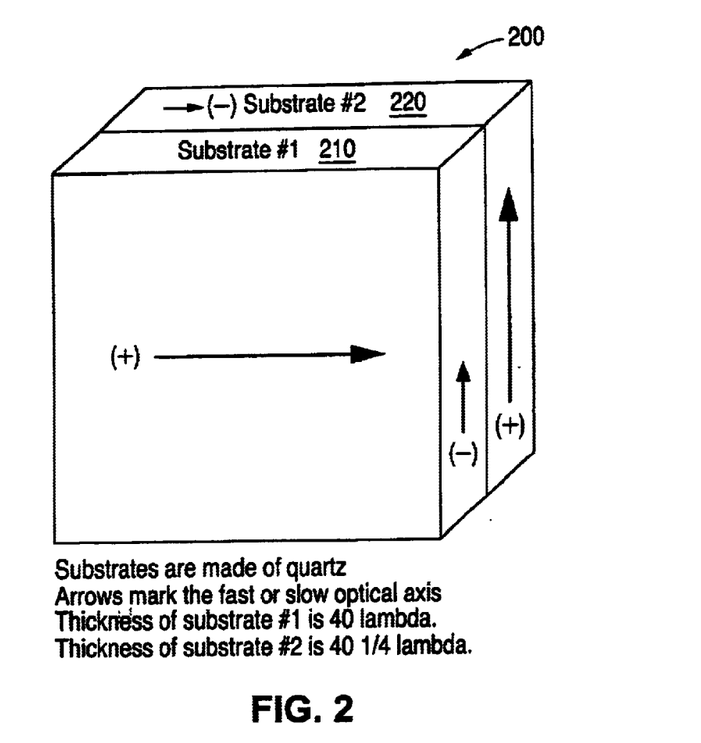
FIG. 2 is a drawing of a compensated higher order waveplate according to an embodiment of the present invention.

Referring again to the drawings, wherein like reference numerals designate identical or corresponding parts, and more particularly to FIG. 2 thereof, there is illustrated a compensated higher order waveplate 200 constructed of two substrates (substrate #1 210 and substrate #2 220). Each of the substrates being a retarder material and each having a principle axis of retardation. The substrates are bonded together with their corresponding principle axes of retardation at right angles with respect to each other. The retardation values of the waveplates differ by a desired amount of wavelength retardation (e.g., a ¼ wavelength difference ($\lambda/4$) in retardation values produces a ¼ waveplate at $\lambda$). The axes being at right angles cause the base retardation effects of each substrate to cancel out, leaving the difference which shows up as the resultant retardation.

The substrates are preferably a birefringent material, meaning that they have two principal axes of retardation. In birefringent material, the principle axes are typically called the fast (main) axis and the slow axis. The axes relate to the molecular structure of the substrate material. In quartz crystal, the fast and slow axes are perpendicular to each other. The substrates are constructed by cutting slabs from quartz crystal material so the molecular axes are in defined directions. For example, in FIG. 2, Substrate #1 210 illustrates a fast axis (+) pointing east and a slow axis (−) pointing north. Substrate #2 220 illustrates a fast axis (+) pointing north and a slow axis (−) pointing east. Thus, the respective axes of retardation of the substrates (210 and 220) are bonded together at right angles forming a compensated higher order waveplate (the fast axis of substrate 210 is oriented at a right angle to the fast axis of substrate 220, and the slow axis of substrate 210 is oriented at a right angle to the slow axis of substrate 220). An alternative way of describing the bonded substrates is that the fast axis of one substrate is parallel to the slow axis of the other substrate.

Example: at 589 nm (in green light) the ordinary index of refraction of quartz $N_0=1.553$ and the extraordinary index $N_e=1.544$. Therefore the birefringence at 589 nm, $\Delta N=0.009$. The thickness of a 40λ waveplate is then 0.644 mm and a 40¼ λ waveplate is 0.655 nm. Therefore, a compensated higher order ¼ waveplate produced by combining the 40λ and 40¼ λ waveplates would be 1.299 mm. The selection of a specific base retardation value of 40λ is arbitrary as far as functionality is concerned. The 40λ base retardation was chosen because the thickness of the resulting compensated waveplate would be convenient to handle during assembly of an optical device (e.g., kernel) using the compensated waveplate. Furthermore, estimates have determined that such a waveplate is also affordable. This example specifically targets green light and results in a ¼ waveplate at the target wavelength, 589 nm, and slightly more or less at other wavelengths. Other indexes, birefringence, and thickness may be applied in various ways to produce similar effects at different wavelengths.

Figure 3A:
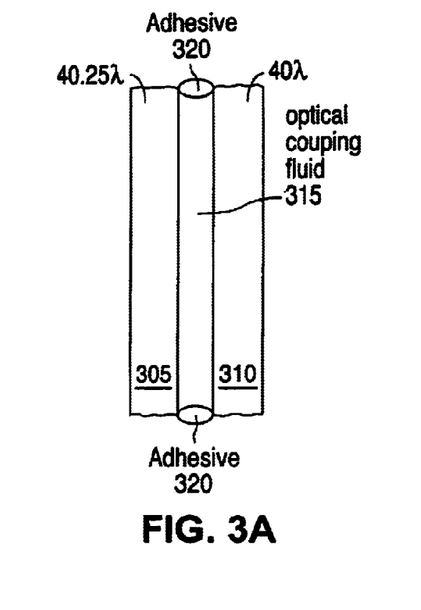
FIG. 3A is a drawing of liquid coupled waveplates forming a compensated higher order waveplate according to an embodiment of the present invention.

The substrates 210 and 220 are fitted together via an adhesive, preferably an optical adhesive, such as an epoxy or UV cured adhesive. Although the present inventors primarily envision the invention to be constructed using an optical adhesive, any other method of coupling the substrates may be utilized. For example, in one embodiment (e.g., see FIG. 3), substrates 305 and 310 are coupled by an optical coupling fluid 315. To couple the substrates with optical coupling fluid, adhesive 320 secures a perimeter of the substrates, and the optical coupling fluid is injected between the waveplates. A fill hole through the adhesive (not shown) is utilized to inject the optical coupling fluid. Alternatively, surfaces of the substrates are whetted with the optical coupling fluid, placed together, and then adhesive is applied to seal in the fluid.

Figure 3B:
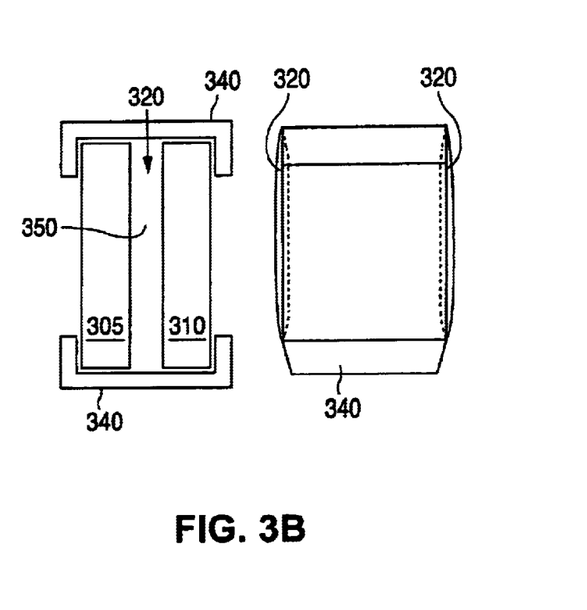
FIG. 3B is a drawing of a compensated higher order waveplate using a frame according to an embodiment of the present invention.

In another embodiment (see FIG. 3B), the substrates 305 and 310 are fitted into a frame (e.g., frame 340). The frame secures parallelism of the surfaces of the substrates. An adhesive placed in the frame secures the substrates to the frame. Space between the substrates 350 may be an air gap, or filled with optical coupling fluid. Adhesive 320 seals the space between the substrates for the liquid filled embodiments (alternatively, frame pieces may be glued in positions across the gap to seal the fluid between the substrates).

Liquid coupling has an advantage of reduced stress, particularly in a central area of the substrates but comes at increased production costs. Some techniques for utilizing optical coupling fluid are described, for example in Detro et al. I, U.S. patent application Ser. No. 10/202,595, entitled "METHOD AND APPARATUS FOR CONFIGURATION AND ASSEMBLY OF A VIDEO PROJECTION LIGHT MANAGEMENT SYSTEM"; and Berman et al., U.S. patent application Ser. No. 10/290,867, entitled "METHOD AND APPARATUS FOR PACKAGING OPTICAL ELEMENTS" each of which are incorporated herein by reference in their entirety).

Thus, using the above example with reference to FIG. 2, the compensated higher order waveplate 200 operates as a quarter waveplate. Since the corresponding principle retardation axes of the substrates 210 (40$\lambda$ waveplate, e.g. an n$\lambda$ waveplate where n=40) and 220 (40.25$\lambda$ waveplate, e.g., an (n+$\Delta$)$\lambda$ waveplate where n=40 and $\Delta$=0.25) are at right angles, as light passes through both substrates, the effect is an optical subtraction that results in a quarter wavelength retardation (40.25−40=0.25). Any combination of base retardation values n$\lambda$ (40$\lambda$ in the example) may be utilized (e.g., 10$\lambda$, 20$\lambda$, 30$\lambda$, 50$\lambda$, 60$\lambda$, in whole numbers or fractional values, etc.).

The selection of a base retardation value is made so that the final thickness of the compensated higher order waveplate is suitable for any physical requirements or preferences of either a device being constructed, a manufacturing process, or other factor(s) affecting, for example, the design or dimensions of the device. Furthermore, if convenient, more than two substrates may be combined, so long as the resultant optical subtraction results in the desired amount of wavelength retardation.

Figure 4:
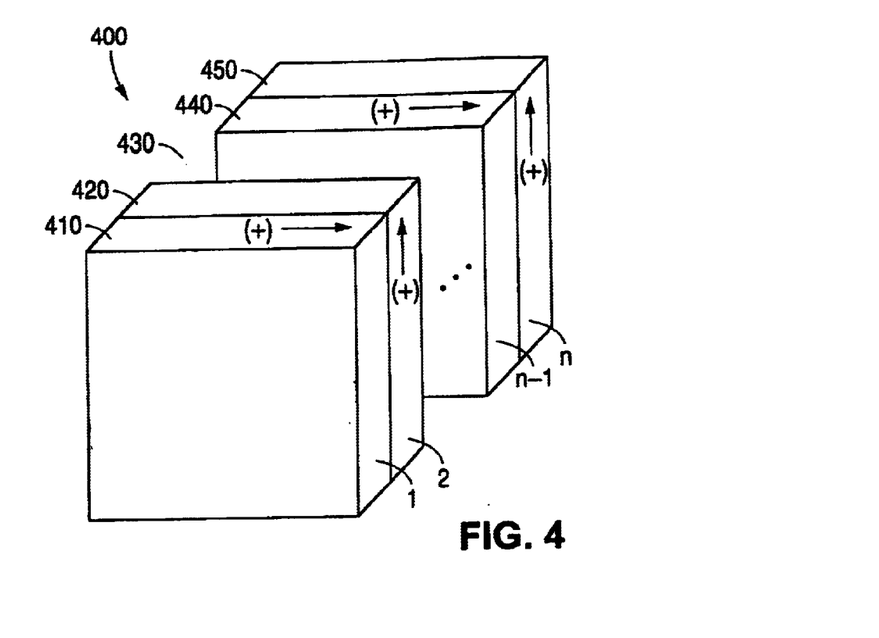
FIG. 4 is an example of a compensated higher order waveplate using n substrates arranged according to an embodiment of the present invention.

FIG. 4 is an example of a compensated higher order waveplate 400 using n substrates arranged according to an embodiment of the present invention. Substrate 1 410 is shown with a first principle fast axis of retardation (+), and substrate 2 420 is shown with a second principle fast axis of retardation (+), which is oriented 90 degrees from the first principle fast axis of substrate 410. Additional substrates 430 are also included, and may be any number of individual substrates. Substrate n−1 440 is shown with a third principle fast axis of retardation (+), and substrate n 450 is shown with a fourth principle fast axis of retardation (+) oriented 90 degrees from the third principle fast axis of substrate 440. The thickness of each of the substrates along with the orientation of their respective axes of retardation optically combine so as to produce a desired amount of retardation of polarization at $\lambda$ of linear polarized light passing through the waveplate. For example, for a ½ waveplate the combined thickness of each substrate having its principle fast axis parallel with the first principle fast axis of substrate 410 is different from the combined thickness of each substrate having its principle fast axis aligned with the second principle fast axis of substrate 420. The difference is equivalent to a thickness needed to produce a ½ waveplate at $\lambda$ (the target wavelength). Many different combinations of base retardations may be utilized. The combined substrates may be configured to produce any value waveplate (e.g., ¼ waveplate, ½ waveplate, ¾ waveplate, etc.). Although the resultant polarization retardation is described herein in commonly used fractional values, the resultant polarization retardation may be produced in less common increments for any amount of retardation that may be desired at any given target wavelength.

In one example, each of the substrates is optimized for red light. In this example, orientation of the substrate is described relative to a reference (ref) line that is parallel with the linear polarization of light input to the waveplate. The substrate 1 410 is a 40$\lambda$ substrate with its principle fast axis of retardation parallel to the reference line (+axis parallel to ref), substrate 2 is a 10$\lambda$ substrate with its principle fast axis of retardation at 90 degrees to the reference line (+axis in ref +90 degrees), substrate n−1 is 20$\lambda$ (+axis parallel to ref) substrate, and substrate n is a 20.5×(+axis in ref +90 degrees) substrate. Additional substrates 430 are a set of substrates that optically combine to produce a net retardation of 30$\lambda$ (+axis in the ref +90 degrees). Then, the net result of the compensated higher order waveplate 400 is, in this example, an optical combination that produces a ½ waveplate in red light.

Using these various ways to combine substrates, great flexibility is provided to the designer and/or manufacturer of waveplates and/or devices using the waveplates.

Thus, the present invention also includes a method of designing a waveplate for an optical device. The method includes measuring an area in which a waveplate is to be inserted into the optical device, calculating thicknesses of 2 substrates to be fitted together to produce a desired waveplate and have a combined thickness within an acceptable thickness range determined by the measured area. The desired waveplate is then constructed from the 2 substrates and the desired waveplate is then utilized to manufacture the optical device.

For example, an optical device includes a spacing of approximately 60.5$\lambda$ between adjacent optical elements, and a design of the optical device calls for a ¼ waveplate at $\lambda$ to be inserted between the optical elements. In this case, the ¼ waveplate is constructed using 30$\lambda$ and 30.25$\lambda$ substrates to produce a ¼ waveplate (substrates combined as described above) A very small amount of optical adhesive is applied to portions of outer faces of the combined substrates and then the combined substrates are inserted in the 60.5$\lambda$ spacing.

In one alternative, 5 10$\lambda$ substrates and a sixth 10.25$\lambda$ substrate are combined such that substrates 1, 3, and 5 have their principle fast axes of retardation aligned with a linear polarization of input light, and substrates 2, 4, and 6 have their principle fast axes of retardation oriented at 90° with respect to the linear polarization of the input light. In this alternative, 4 of the substrates effectively cancel each other out and one of the substrates combined with the 10.25$\lambda$ substrate creates the ¼ waveplate. Again, the substrates may be placed in any order so long as the orientations of each of the principle fast axes (or other corresponding axes) are maintained as described above. The point of examples with numerous additional waveplates as shown in the preceding paragraphs is to illustrate design flexibility and alternatives provided by the present invention.

In yet another alternative, 10λ and 10.25λ substrates are combined and placed in the 60.5λ spacing with liquid coupling between at least one face of the adjacent optical elements and at least one face of the combined substrates. Any combination of mounting techniques may be utilized for the waveplate including, but not limited to, liquid coupling, direct mounting, mounting frames with adjustment screws, etc.

Inserting the manufactured waveplate into the optical device may be performed by gluing (optical adhesive) the manufactured waveplate onto other optical elements (e.g., prism faces) of the optical device. Other means to insert or otherwise attach the manufactured waveplate to the optical device include liquid coupling, or immersion in a liquid coupling fluid chamber between other optical elements. Some example liquid coupling techniques are described in Berman et al. (II), U.S. patent application Ser. No. 10/328,423 entitled "Method and Apparatus for Enclosing Optical Assemblies," filed Dec. 24, 2002; Detro et al. (II), U.S. patent application Ser. No. 10/290,867 entitled "Method and Apparatus for Packaging Optical Elements," filed Nov. 7, 2002; and Detro et al. (III), U.S. patent application Ser. No. 10/251,104 entitled "Method and Apparatus for Mounting Liquid Crystal on Silicon (LCoS) and Other Sensitive Devices," filed Sep. 20, 2002, the contents of each are incorporated herein by reference in their entirety.

In many optical devices, particularly kernels and/or prism assemblies of projection display devices, physical and optical distances between various components of the optical devices are important. For example, in a kernel of a light management system (LMS) important distances include the optical distances from each of the microdisplay faces to the exit face of the kernel. The importance being that the 3 light beams (e.g., red, green, and blue) need to reach the exit face with essentially the same optical distance. The light management system will typically include a lens (or lens assembly) for focusing and projecting images contained within the three combined light beams. Generally speaking, if corresponding portions of the light beams arrive at the exit face within a depth of field of the focusing lens, then the images will be in focus. Also generally speaking, in some designs, the optical distances (and physical distances of the optical paths) between the faces of optical components (e.g., microdisplay substrates) and the exit face are roughly equivalent or within the depth of field of the focusing lens. Therefore, it is of great convenience to designers and manufacturers of prism assemblies if waveplates (retarders, polarizers, and/or other components) can be produced at equivalent thicknesses or at designer specified thicknesses so that these roughly equivalent distances can be preserved and taken full advantage of.

Methods of designing and constructing waveplates at specified thicknesses is discussed above. Another method is now described with reference to FIG. 3C. A frame 362 has a designer specified height H. In the frame, substrates 364 and 366 are arranged as described above (e.g., the principle fast axis of substrate 364 is perpendicular to the principle fast axis of substrate 366), and secured to the frame. In this example, the frame includes corners that act as stops (aligning the substrates) and provide a convenient location to secure the substrates. Adhesive (e.g., adhesive 367) is applied to the frame at the substrates (e.g., adhesive applied and then the substrates are inserted).

Figure 3C:
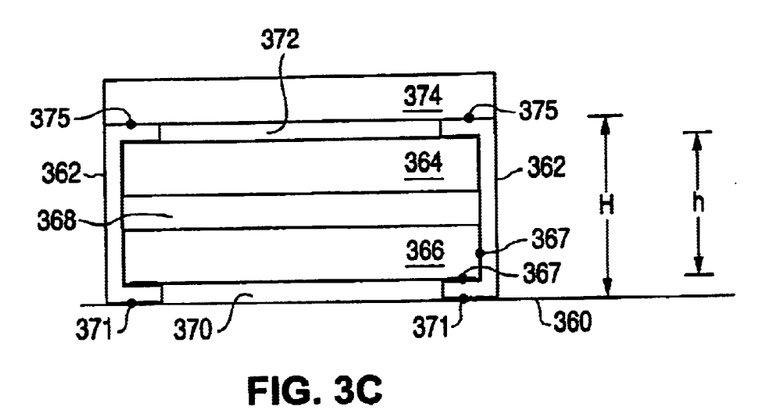
FIG. 3C is a drawing that illustrates a compensated higher order waveplate and a construction method thereof according to embodiments of the present invention.

A gap 368 is between substrates 364 and 366. The gap compensates for any differences in thicknesses between varying thickness substrates combined to make different waveplates. For example, a red quarter waveplate constructed of 20λ and 20.25λ substrates has a slightly larger total substrate thickness, and consequently a smaller gap 368, than a green waveplate constructed of similar wavelength based substrate thickness (e.g., using green 20λ and 20.25λ substrates instead of red). Using this frame based technique to create designer specified waveplate dimensions frees the manufacturer to use substrates having a wide range of substrates thicknesses to produce the waveplates (The designer specifies an overall thickness and a target wavelength, and the manufacturer uses available substrate stocks in a combination to produce the target wavelength retardation in a frame size equivalent to the designer's specified overall thickness).

In another example, a designer may want the optical paths to match exactly, in which case heights (both H and h) of the frames may be varied for each of the red, green, and blue waveplates (e.g., compensated higher order waveplates designed to replace waveplates 110, 112, and 114). For example, assuming a prism assembly with approximately perfect outside dimensions and approximately equivalent physical light path distances inside the prism assembly, then, the frames for the red waveplates would be slightly longer than frames for green waveplates, which would be slightly longer than frames for blue waveplates. In yet another example, frame heights may be adjusted to compensate for lightpath differences (e.g., differences in internal lightpaths of the prism assembly).

The gap not only allows flexibility in construction, but also reduces problems encountered when optical components are fixed together (e.g., such as stress build up or other artifacts, such as Newton Rings, which can occur if the optical components were to contact each other).

The gap 368 is, for example, an air gap between the substrates. Surfaces of the substrates exposed to air are coated with anti-reflection coatings. In another embodiment, the gap 368 is sealed with adhesive and/or a combination of adhesive and a frame member and the gap is filled with an optical coupling fluid.

The invention includes mounting the waveplates to a face of an optical component. For example, frame 362 is illustrated as mounted to a face 360 of a polarizing beamsplitter (PBS) cube. The PBS is, for example, a pathlength matched PBS as described in Detro et al. IV, U.S. patent application Ser. No. 10/251,225, entitled "PATHLENGTH MATCHED BEAM SPLITTER AND METHOD AND APPARATUS FOR ASSEMBLY". The polarizing beam splitter is, for example, a component of a pathlength matched prism assembly as described in Detro et al. I. One method of mounting comprises adhesive 371 applied to a portion of the frame and/or to the face 360 of the PBS to secure the waveplates to the PBS. With the described frame, a waveplate/component gap 370 occurs between the component and substrate 366. Faces of the substrate 366 and component are coated with anti-reflection coatings (which reduce or eliminate unwanted reflections, including the prevention of standing waves that might otherwise develop between the substrates). In one embodiment, the gap 370 is sealed and filled with optical coupling fluid.

Continuing with FIG. 3C, a microdisplay 374 is mounted on the frame 362. Adhesive is applied, for example, at point 375 securing the microdisplay 374 to the frame. A microdisplay/waveplate gap 372 occurs between the waveplate and microdisplay 374. A face of the substrate 364 adjacent to the microdisplay and a face of the microdisplay adjacent to substrate 364 are coated with anti-reflection coatings. In one embodiment, as either an alternative to or combined with anti-reflection coatings, the gap 372 is sealed and filled with optical coupling fluid.

Any number of alternative techniques for mounting the waveplates and microdisplays may be utilized. Several alternatives are described in Detro et al. III.

Figure 3D:
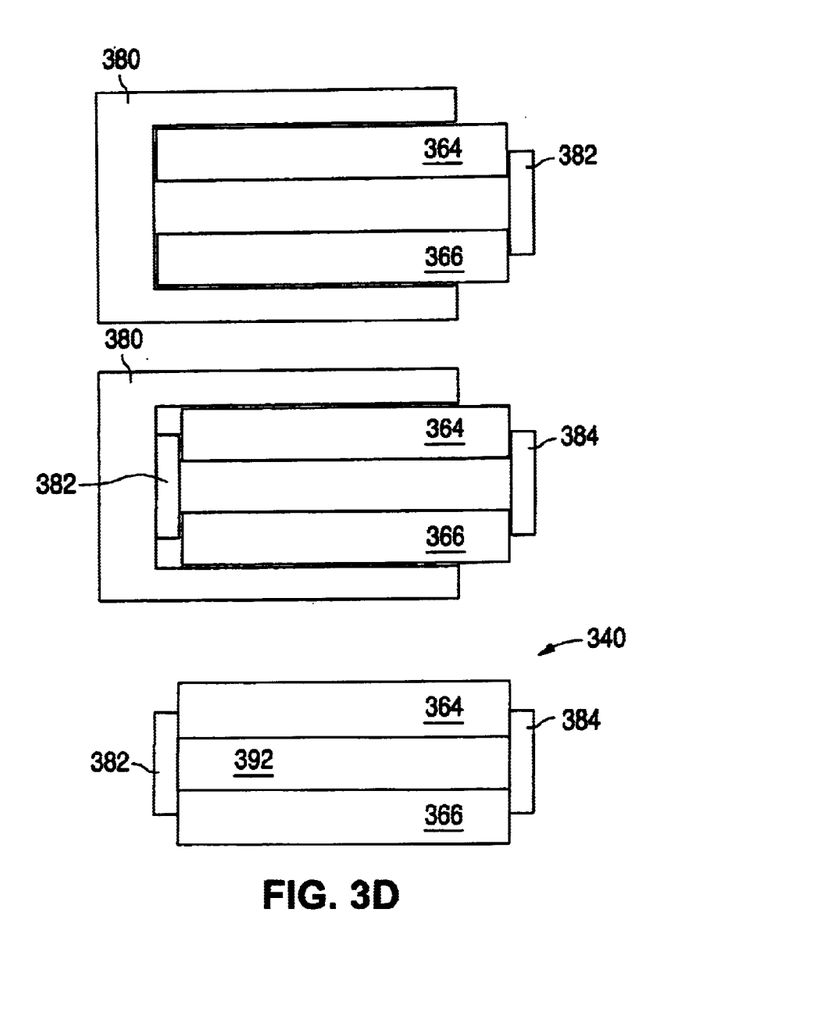
FIG. 3D illustrates construction of another embodiment of a waveplate according to the present invention.

Substrates 364 and 366 are arranged according to the present invention in a precision C-clamp style holder 380. The holder 380 includes, for example, vacuum chucks that temporarily secure the substrates in the holder 380. Adhesive is applied to end portions of the waveplates and/or frame member 382 and the frame member is secured by the adhesive at the end portions of the waveplates. Next, the substrates are removed from the holder and reinserted in the opposite direction. A second frame member 384 is then similarly attached to opposite end portions. Faces of the substrates surrounding gap 392 are coated with anti-reflection coatings, or the gap is sealed and filled with optical coupling fluid. The finished waveplate 390 includes the substrates and frame members (as with all drawings submitted herewith, the drawings are not specifically to scale). The holder 380 may take the form of an adjustable vise device such as that described in Berman et al., which sets spacings of the substrates to any reasonable value.

As noted above, the compensated higher order waveplates are constructed to act as a waveplate at a specific target frequency. However, the single compensated higher order waveplate has effects of polarization rotation at other frequencies not at the target frequency. For some applications, these other retardation effects may be negligible for light in a same spectrum band as the target frequency. For example the compensated higher order waveplate that targets 589 nm light will have more or less retardation at other wavelengths also in the green spectrum, but the differing amounts of retardation in the green spectrum can be acceptable.

However, in other wavelength bands (e.g. red light), the amount of retardation may be of an amount that is either unusable or undesirable. In applications such as some kernel designs (e.g., kernel 100) the undesirability of retardation effects outside the targeted wavelength band is negated by the fact that only light in the targeted wavelength band is input. For example, in kernel 100, the green ¼ waveplate 110 may be replaced with a compensated higher order waveplate without much concern for undesirable retardation effects out of the target wavelength band because only (or only substantially) green light is input to the waveplate. The same principle applies to each of waveplates 112 and 114 when replaced with corresponding blue and red compensated higher order waveplates.

Nevertheless, some applications require wavelength band specific retarders that affect (retard) the linear polarization in a targeted wavelength band(s) and preserve linear polarization in other wavelength bands (e.g., $1\lambda$, $2\lambda$, . . . $n\lambda$ retardation in other wavelength bands preserves the original linear polarization). The present inventors have realized the ability of the compensated higher order waveplates to be utilized in creating a desired wavelength band specific retarder for one or multiple wavelengths. The basic process is to calculate a set of compensated higher order waveplates combined at specific angles where the sum of retardations and other optical properties of the set of compensated higher order waveplates together at those specific angles produce the desired wavelength band specific retarder.

Figure 5:
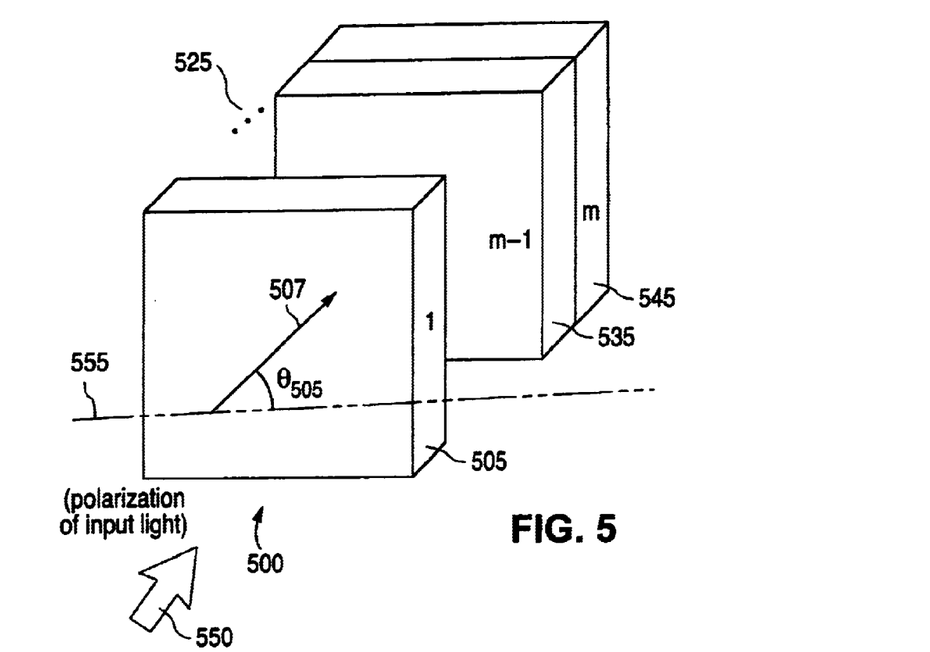
FIG. 5 is an example of one set of possible configurations for a wavelength band specific retarder utilizing compensated higher order waveplates according to an embodiment of the present invention.

FIG. 5 is an example of a wavelength band specific retarder 500 using m compensated higher order waveplates arranged according to an embodiment of the present invention. Compensated higher order waveplate 505 is shown with a main axis of retardation 507 at an orientation of $\theta_{505}$. Orientation of the main axis 507 is described in the figure with reference to reference line 555. Reference line 555 is aligned at a same angle of linear polarization of input light 550 entering the wavelength band specific retarder 500. Orientation of the main axis 507 is at an angle $\theta_{505}$ relative to the linear polarization of input light 550.

Other compensated higher order waveplates 525 also have main axes of retardation (not shown) which are positioned at various angular orientations with respect to the reference line 555. Additional other compensated higher order waveplates 535 and 545 also each include their own respective main axes of retardation and orientations at respective angles to the reference 555 (e.g., $\theta_{535}$ and $\theta_{545}$). Each of the angles of orientation are either the same, more, or less than any of the previous waveplates, and the actual amount of angular orientation of each waveplate depending on the calculations performed to determine the specific angles needed to produce a desired wavelength band specific retarder. The calculations performed are done in accordance with known wavelength specific properties and using formulas available in textbooks, literature, and other patents. In addition, the actual band(s) in which the desired wavelength band specific retarders operate is also determined by calculation and used in the construction of the component compensated higher order waveplates and/or the orientation and placement of each component in the wavelength band specific retarder.

Each of the above described main axes refer to one of the axes (or combination of axes) present in the substrate components of the compensated higher order waveplates. The construction of the compensated higher order waveplate being the combination of substrates with corresponding axes (e.g., principle fast axes) of the substrates at right angles (e.g., fast axis of the $n\lambda$ substrate parallel to slow axis of the $(n+\Delta)\lambda$ substrate, etc.). Here, when referring to the main axis of the compensated higher order waveplate, we are referring to an axis parallel to the fast axis of the $(n+\Delta)\lambda$ substrate. Each of the compensated higher order waveplates are described using a similarly determined main axis, and all angles of orientation of the axes are relative to the polarization of light input to the wavelength band specific retarder 500. However, it should be understood that any of the waveplates or wavelength band specific retarders herein may be described using other axes or frames of reference that maintain a similar or functionally equivalent orientation of the substrates, waveplates, etc.

FIG. 5 is operable as a wavelength band specific retarder with or without the additional compensated higher order waveplates 525. In one example, a red wavelength band specific retarder is produced by using 3 compensated higher order waveplates, a first compensated higher order waveplate 505 is constructed targeting a 475 nm wavelength, a second compensated higher order waveplate m−1 525 is constructed targeting a 950 nm wavelength, and a third compensated higher order waveplate m 545 is constructed also targeting the 950 nm wavelength. The first compensated higher order waveplate 505 has its main axis set at 45 degrees with respect to the reference line (or intended polarization of input light). The second compensated higher order waveplate 535 has its main axis set at −13.2 degrees with respect to the reference line, and the third compensated higher order waveplate 545 has its main axis set at 9.9 degrees with respect to the reference line. The resultant combination of the three compensated higher order waveplates is a wavelength band specific retarder that converts the linear polarized red wavelength band of light input to the wavelength band specific retarder to orthogonal polarization (90 degrees), while preserving the polarization of the input light in the blue and green wavelength bands.

In another example, a red wavelength band specific retarder is produced by using 5 compensated higher order waveplates, a first compensated higher order waveplate 505 is constructed targeting a 475 nm wavelength. Additional compensated higher order waveplates 525 comprise 2 individual compensated higher order waveplates, identified as waveplates 526 and 527, are each constructed targeting a 950 nm wavelength. 4th and 5th waveplates, 535 and 545 respectively are also constructed targeting the 950 nm wavelength. With respect to the polarization of input light (e.g., reference 555), the main axis of each waveplate is oriented as follows: 505 at 45 degrees, 526 at −15.0 degrees, 527 at 13.1 degrees, 535 at −2.1 degrees, and 545 at 6.3 degrees.

In another example, a red wavelength band specific retarder is produced by using 7 compensated higher order waveplates, a first compensated higher order waveplate 505 is constructed targeting a 475 nm wavelength. Additional compensated higher order waveplates 525 comprise 4 individual compensated higher order waveplates, identified as waveplates 526, 527, 528, and 529, each constructed targeting a 950 nm wavelength. 6th and 7th waveplates, 535 and 545 respectively are also constructed targeting the 950 nm wavelength. With respect to the polarization of input light (e.g., reference 555), the principle axis of each waveplate is oriented as follows: 505 at 45 degrees, 526 at −15.5 degrees, 527 at 14.0 degrees, 528 at −3.4 degrees, 529 at 7.8 degrees, 535 at 0.5 degrees, and 545 at 5.2 degrees.

In yet another example, a red wavelength band specific retarder is produced by using 9 compensated higher order waveplates, a first compensated higher order waveplate 505 is constructed targeting a 475 nm wavelength. Additional compensated higher order waveplates 525 comprise 6 individual compensated higher order waveplates, identified as waveplates 526, 527, 528, 529, 530, and 531, each constructed targeting a 950 nm wavelength. 8th and 9th waveplates, 535 and 545 respectively are also constructed targeting the 950 nm wavelength. With respect to the polarization of input light (e.g., reference 555), the main axis of each waveplate is oriented as follows: 505 at 45 degrees, 526 at −15.7 degrees, 527 at 14.5 degrees, 528 at −4.0 degrees, 529 at 8.5 degrees, 530 at −0.4 degrees, 531 at 6.1 degrees, 535 at 1.5 degrees, and 545 at 4.7 degrees.

In the above described example embodiments, as more waveplates are used, the more precisely the wavelength band specific retarder's operations are (e.g., cutting off at a more precise wavelength where polarization rotation either occurs or does not occur). Said another way, as more waveplates are used, a transition band, between polarized light that is rotated and linear polarized light that is not rotated, where the light is elliptically polarized becomes smaller. Further embodiments may use more compensated higher order waveplates to further refine the optical properties of the wavelength band specific retarder.

Although the above examples are red wavelength band specific retarders, the invention is not limited to red wavelength band specific retarders. Similar arrangements may be made for orienting compensated higher order waveplates to construct wavelength band specific retarders for any band of light. For example, wavelength band specific retarders may be constructed using similar techniques for blue and green light. The number of compensated higher order waveplates, each specific target wavelength, and orientation will be set according to the requirements for the desired wavelength band specific retarder.

The present invention includes the use of stacking wavelength band specific retarders to produce multi non-contiguous wavelength band specific retarders. In this example, multiple wavelength band specific retarders are constructed. The multiple wavelength band specific retarders are placed in series. Light is orthogonally polarized for each of the bands according to the construction of the multiple wavelength band specific retarders and the polarization of other bands of light are left unrotated. For example, wavelength band specific retarders are constructed for each of red and blue wavelength bands. The red and blue wavelength band specific retarders are placed in series and linear polarized input light in both the red and blue bands are rotated and the linear polarization of input light in the green band is maintained.

Wavelength band specific retarders and multi non-contiguous wavelength band specific retarders according to the present invention may be constructed for any one or more wavelength bands or portions of bands.

The present invention also includes stacking a set of compensated higher order waveplates without regard to any particular contiguous subset thereof being a wavelength band specific retarder. However, the net effect of the stacked compensated higher order waveplates is either a single or multi non-contiguous wavelength band specific retarder, depending on the requirements, design, and combined properties of the individual compensated higher order waveplates. The possible combinations of individual compensated higher order waveplates, orientations, etc is virtually limitless. The present invention clearly includes any compensated higher order waveplate whether used individually as a waveplate targeting a specific wavelength (or range of wavelengths), as a component in a larger system, or, in combination with other compensated higher order waveplates to produce wavelength band specific retarders in one or more bands.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A compensated higher order waveplate, comprising a first substrate and a second substrate arranged such that an axis of retardation of the first substrate is set at an angle to a corresponding axis of retardation of the second substrate;

wherein the first substrate is a $n\lambda$ waveplate and the second substrate is a $(n+\Delta)\lambda$ waveplate.

2. The compensated higher order waveplate according to claim 1, wherein $\Delta\lambda$ is an incremental retardation that produces a desired amount of retardation of a lightwave at $\lambda$ passing through the compensated higher order waveplate.

3. The compensated higher order waveplate according to claim 2, wherein $\lambda$ comprises a wavelength of at least one of red, blue, and green light.

4. A compensated higher order waveplate, comprising a first substrate and a second substrate arranged such that an axis of retardation of the first substrate is set at an angle to a corresponding axis of retardation of the second substrate;
wherein the first substrate and the second substrate are affixed together with an optical adhesive.

5. A compensated higher order waveplate, comprising a first substrate and a second substrate arranged such that an axis of retardation of the first substrate is set at an angle to a corresponding axle of retardation of the second substrate;
wherein the first substrate and the second substrate are fitted in a frame that maintains registration and a gap between the substrates; and
the compensated higher order waveplate further comprising optical coupling fluid disposed in said gap.

6. A compensated higher order waveplate, comprising a first substrate and a second substrate arranged such that an axis of retardation of the first substrate is set at an angle to a corresponding axis of retardation of the second substrate;
wherein the substrates are coupled via a liquid filled joint between the substrates.

7. A compensated higher order waveplate mounted between a microdisplay and an optical element of a light projection system.

8. The compensated higher order waveplate according to claim 7, wherein said optical element is a PBS of a kernel.

9. The compensated higher order waveplate according to claim 7, wherein said light projection system comprises a pathlength matched prism assembly.

10. The compensated higher order waveplate according to claim 8, wherein said PBS is a pathlength matched PBS.

11. The compensated higher order waveplate according to claim 10, wherein said kernel comprises a liquid coupled pathlength matched prism assembly.

12. An optical device comprising
a waveplate, comprising,
a first substrate having a first axis of retardation, and
a second substrate having a second axis of retardation;
wherein:
the first substrate and the second substrate are arranged such that the first and second axes of retardation are perpendicular;
operation of the waveplate is optimized for a target wavelength $\lambda$;
the first substrate comprises a retarder material having a thickness that produces $n\lambda$ retardation at the target wavelength;
the second substrate comprises a retarder material having a thickness that produces an $(n+\Delta)\lambda$ retardation at the target wavelength; and
$\Delta\lambda$ is an increment that represents a desired net amount of retardation of a lightwave passing through the compensated higher order waveplate.

13. The optical device according to claim 12, wherein the axes of retardation have the same relative speed.

14. An optical device, comprising:
a first waveplate, comprising,
a first substrate having a first axis of retardation, and
a second substrate having a second axis of retardation;
a second waveplate; and
a third waveplate;
wherein:
the first substrate and the second substrate are arranged such that the first and second axes of retardation are perpendicular; and the first, second, and third waveplates are arranged so as to produce a wavelength band specific retarder that linearly polarized light in a target wavelength band pausing through the optical device is rotated, and linearly polarized light in other wavelength bands passing through the optical device are left unrotated.

15. The optical device according to claim 14, wherein the rotation of linear polarized light in the target wavelength band is approximately 90 degrees.

16. The optical device according to claim 14, wherein the rotation of linear polarized light in the target wavelength band comprising $\lambda$ is $\lambda/2$.

17. The optical device according to claim 14, wherein the rotation of linear polarized light in the target wavelength band comprising $\lambda$ is $\lambda/4$.

18. The optical device according to claim 14, wherein the target wavelength band comprises at least one of red, green, and blue light.

19. The optical device according to claim 14, wherein the first, second, and third waveplates comprise a first wavelength band specific retarder; and
the optical device further comprises,
a second wavelength band specific retarder arranged in series with the first wavelength band specific retarder;
the second wavelength band specific ratarder having a target wavelength band different from the first wavelength band specific retarder.

20. The optical device according to claim 19, wherein the second wavelength band specific retarder is constructed similarly to the first wavelength band specific retarder.

21. The optical device according to claim 19, wherein the target wavelength bands of first and second wavelength band specific retarders operate in non-contiguous wavelength bands.

22. An optical device comprising:
a first waveplate, comprising,
a first substrate having a first axis of retardation, and
a second substrate having a second axis of retardation,
the first substrate and the second substrate are arranged such that the first and second axes of retardation are perpendicular;
a second waveplate; and
a third waveplate;
wherein:
each of the second and third waveplates being constructed similarly to the first waveplate and arranged in series with the first waveplate; and
each of the first, second, and third waveplates are compensated higher order waveplates each having a main axis; and
the main axes of each waveplate is oriented to produce a wavelength band specific retarder.

23. The optical device according to claim 22, wherein, relative to a reference line, the main axle of the first waveplate is oriented at 45 degrees, the main axis of the second waveplate is oriented −13.2 degrees, and the main axis of the third waveplate is oriented at 9.9 degrees.

24. The optical device according to claim 23, wherein the reference line is oriented at 0 degrees relative to a linear polarization of light intended to be Input Into the optical device.

25. An optical device, comprising:
a first waveplate, comprising,
a first substrate having a first axis of retardation, and a second substrate having a second axis of retardation, the first substrate and the second substrate are arranged such that the first and second axes of retardation are perpendicular;

a second waveplate; and a third waveplate;

wherein:

each of the second and third waveplates being constructed similarly to the first waveplate and arranged in series with the first waveplate;

the first waveplate targets a 475 nm wavelength;

the second waveplate targets a 950 nm wavelength; and the third waveplate targets a 950 nm wavelength; and a result of the waveplates in series is a wavelength band specific retarder that rotates linear polarization of light passing through the optical device in the red wavelength band to orthogonal polarization while preserving linear polarization of light passing through the optical device in the blue and green wavelength bands.

26. The optical device according to claim 25, wherein:

each of the first, second, and third waveplates are compensated higher order waveplates each having a main axis of retardation; and relative to a reference line, the main axis of the first waveplate is oriented at 45 degrees, the main axis of the second waveplate is oriented at −13.2 degrees, and the main axis of the third waveplate is oriented at 9.9 degrees.

27. The optical device according to claim 26, wherein each of the main axes correspond to a fast axis of retardation of the second substrate.

28. The optical device according the claim 27, wherein:

the first substrate of each waveplate is a substrate that produces an $n\lambda$ retardation;

the second substrate of each waveplate is a substrate that produces an $(n+\Delta\lambda)$ retardation; and for each substrate, $\lambda$ is the target wavelength at which the retardations of the substrates occur.

29. An optical device, comprising:

a waveplate, comprising, a first substrate having a first axis of retardation, and a second substrate having a second axis of retardation;

wherein:

the first substrate and the second substrate are arranged such that the first and second axes of retardation are perpendicular;

the first substrate has thickness that produces an $n\lambda$ retardation;

the second substrate has a thickness that produces an $(n+\Delta)\lambda$ retardation; and $\lambda$ is a target wavelength at which the retardations of the substrates occur.

30. An optical device comprising:

a waveplate, comprising, a first substrate having a first axis of retardation, and a second substrate having a second axis of retardation;

wherein:

the combined value of retardation of the first substrate and retardation of the second substrate is greater than $1\lambda$;

the first substrate and the second substrate are arranged such that the first and second axes of retardation are perpendicular; and each of the substrates are arranged in a frame with a gap between the substrates.

31. The optical device according to claim 30 further comprising anti-reflection coatings on surfaces of the substrates.

32. The optical device according to claim 30, wherein the first substrate is a n substrate and the second substrate is a $(n+\Delta)\lambda$ substrate.

33. The optical device according to claim 13, wherein the waveplate comprises a first waveplate;

the optical device further comprises second, third, fourth, and fifth waveplates each constructed similarly to the first waveplate; and said first, second, third, fourth, and fifth waveplates are arranged in series.

34. The optical device according to claim 33, wherein the waveplates are arranged to produce a wavelength band specific retarder that rotates linearly polarized light in a target wavelength band passing through the optical device and maintains linear polarization of light in other bands of light passing through the optical device.

35. An optical device comprising:

a waveplate, comprising, a first substrate having a first axis of retardation, and a second substrate having a second axis of retardation;

the first substrate and the second substrate are arranged such that the first and second axes of retardation are perpendicular; and the waveplate is a first waveplate;

the optical device further comprising a second waveplate and a third waveplate, each of the second and third waveplates being constructed similarly to the first waveplate and arranged in a series with the first waveplate and wherein:

each of the first, second, and third waveplates are compensated higher order waveplates each having a main axis; and relative to a reference line, the main axis of the first waveplate is oriented a 45 degrees the main axis of the second waveplate is oriented at −15.0 degrees, the main axis of the third waveplate is oriented at 13.1 degrees, the main axis of the fourth waveplate is oriented at −2.1 degrees, and the main axis of the fifth waveplate is oriented at 6.3 degrees.

36. The optical device comprising:

a waveplate, comprising, a first substrate having a first axis of retardation, and a second substrate having a second axis of retardation;

the first substrate and the second substrate are arranged such that the first and second axes of retardation are perpendicular; and the waveplate is a first waveplate;

the optical device further comprising a second waveplate arid a third waveplate, each of the second and third waveplates being constructed similarly to the first waveplate and arranged in a series with the first waveplate; and wherein:

each of the first, second, and third waveplates are compensated higher order waveplates each having a main axis; and the first waveplate targets a 475 nm wavelength;

the second, third, fourth, and fifth waveplates each target a 950 nm wavelength; and a result of the waveplates in series is a wavelength band specific retarder that converts linear polarization of light passing through the optical device in the red wavelength band to orthogonal polarization, while preserving linear polarization of light passing through the optical device in the blue and green wavelength bands.

37. The optical device according to claim 36, wherein:
one of the substrates of each compensated higher order waveplate is of a retarder material having a thickness needed to produce an $(n+\Delta)\lambda$ retardation where $\lambda$ is a target wavelength at which the retardations occur; and
relative to a reference line, the main axis of the first waveplate is oriented at 45 degrees the main axis of the second waveplate is oriented at −13.2 degrees, and the main axis of the third waveplate is oriented at 9.9 degrees.

38. The optical device according to claim 37, wherein the main axis of each compensated higher order waveplate corresponds to a fast axle of retardation of the $(n+\Delta)\lambda$ substrate of the corresponding compensated higher order waveplate.

39. A waveplate, comprising:
a first substrate comprising an $n\lambda$ waveplate having an axis of retardation; and
a second substrate comprising an $(n+\Delta)\lambda$ waveplate having an axis of retardation arranged at an angle to the axis of retardation of the first substrate;
wherein:
$n\lambda$ is a base retardation; and
$\Delta\lambda$ is an incremental retardation that produces a desired amount of retardation of a lightwave passing through the waveplate.

40. The waveplate according to claim 39, wherein $\lambda$ is a target wavelength and the incremental retardation $\Delta\lambda$ causes a rotation of polarization of linear polarized light passing through the waveplate.

41. The waveplate according to claim 40, wherein the rotation of polarization is 90 degrees at $\lambda$.

42. The waveplate according to claim 39, wherein said waveplate is optimized for a $\lambda$ at one of red, blue and green wavelengths.

43. The waveplate according to claim 39, wherein said waveplate is a ¼ waveplate optimized for one of red, blue and green wavelengths.

44. The waveplate according to claim 39, wherein said waveplate is a ½ waveplate optimized for one of red, blue, and green wavelengths.

45. The waveplate according to claim 39, wherein:
the axis of retardation of the first substrate comprises a principle fast axis of retardation of the first substrate;
the axis of retardation of the second substrate comprises a principle fast axis of retardation of the second substrate; and
the angle is 90 degrees.

46. The waveplate according to claim 39, wherein the angle is 90 degrees.

47. The waveplate according to claim 39, wherein the first and second substrates are constructed of birefringent material and the speed of the axis of retardation of the substrates are similar.

48. A wavelength band specific retarder comprising:
a set of compensated higher order waveplates arranged in series;
wherein:
each waveplate having a main axis and a predetermined target wavelength; and
the waveplate main axes are oriented at individual angles of orientation to a reference line;
wherein
the set of compensated higher order waveplates comprises 3 compensated higher order waveplates targeting 475 nm, 950 nm, and 950 nm wavelengths respectively, and oriented at 45 degrees, −13.2 degrees, and 9.9 degrees respectively.

49. A wavelength band specific retarder comprising:
a set of compensated higher order waveplates arranged in series;
wherein:
each waveplate having a main axis and a predetermined target wavelength; and
the waveplate main axes are oriented at individual angles of orientation to a reference line;
wherein:
the set of compensated higher order waveplates comprises 5 compensated higher order waveplates targeting 475 nm, 950 nm, 950 nm, 950 nm, and 950 nm wavelengths respectively, and oriented at 45 degrees, −15.0 degrees, 13.1 degrees, −2.1 degrees, and 6.3 degrees respectively.

50. A wavelength band specific retarder comprising:
a set of compensated higher order waveplates arranged in series;
wherein:
each waveplate having a main axis and a predetermined target wavelength; and
the waveplate main axes are oriented at individual angles of orientation to a reference line;
wherein:
the set of compensated higher order waveplates comprises 5 compensated higher order waveplates targeting 475 nm, 950 nm, 950 nm, 950 nm, 950 nm, 950 nm, and 950 nm wavelengths respectively, and oriented at 45 degrees, −15.5 degrees, 14.0 degrees, −3.4 degrees, 7.8 degrees, 0.5 degrees, and 5.2 degrees respectively.

51. A wavelength band specific retarder comprising:
a set of compensated higher order waveplates arranged in series;
wherein:
each waveplate having a main axis and a predetermined target wavelength; and
the waveplate main axes era oriented at individual angles of orientation to a reference line;
wherein each of the compensated higher order waveplates are affixed in series using a thin layer of optical adhesive.

52. A wavelength band specific retarder comprising:
a set of compensated higher order waveplates arranged in series;
wherein:
each waveplate having a main axis and a predetermined target wavelength; and
the waveplate main axes are oriented at individual angles of orientation to a reference line;
wherein each of the compensated higher order waveplates are affixed in series in a frame with a gap between adjacent compensated higher order waveplates.

53. The wavelength band specific retarder according to claim 52, wherein surfaces of adjacent compensated higher order waveplates include anti-reflection coatings.

54. The wavelength band specific retarder according to claim 52, wherein said gap is filled with an optical coupling fluid.

55. The higher order waveplate according to claim 1, wherein the waveplate is mounted in a light channel of a projection device.

56. The higher order waveplate according to claim 1, wherein the waveplate is mounted in a light channel of a Liquid Crystal on Silicon (LCoS) projection television.

57. The higher order waveplate according to claim 1, wherein the waveplate is coupled to a pathlength matched prism assembly.

58. The higher order waveplate according to claim 1, wherein the waveplate is positioned in a lightpath of a pathlength matched prism assembly.

59. The optical device according to claim 12, wherein the optical device is arranged in a lightpath of a prism assembly in a video projection device.

60. The optical device according to claim 4, wherein the prism assembly comprises a pathlength matched prism assembly including at least one pathlength matched beamsplitter.

61. The optical device according to claim 4, wherein the video projection device comprises a projection television.

62. The optical device according to claim 5, wherein the video projector device comprises a projector based on reflective Liquid Crystal on Silicon (LCoS) microdisplays.

63. The waveplate according to claim 39, wherein the waveplate is installed in a lightpath of an image projector.

64. The waveplate according to claim 39, wherein the waveplate is part of a prism assembly in a Liquid Crystal on Silicon (LCoS) display device.

65. The waveplate according to claim 39, wherein the waveplate is part of a pathlength matched prism assembly including a pathlength matched beamsplitter in a projection monitor.

66. A Liquid Crystal on Silicon (LCoS) television comprising:
   a prism assembly;
   an LCoS microdisplay mounted in proximity of the prism assembly; and
   a compensated higher order waveplate mounted between the prism assembly and the LCoS microdisplay.

67. A microdisplay based projector comprising:
   a prism assembly configured to manage at least one light channel of the projector;
   a microdisplay mounted in a position to modulate light in the light channel; and
   a higher order waveplate mounted in the light channel between the microdisplay and the prism assembly.

68. The microdisplay based projector according to claim 67, wherein the microdisplay comprises a reflective Liquid Crystal on Silicon (LCoS) microdisplay.

69. The microdisplay based projector according to claim 67, wherein the projector comprises a Liquid Crystal on Silicon (LCoS) projection television.

70. A microdisplay based projector, comprising:
   a prism assembly;
   a microdisplay mounted to the prism assembly; and
   a compensated higher order waveplate mounted in a light path comprising light being directed by the prism assembly to the microdisplay.

71. The microdisplay projector according to claim 70, wherein the microdisplay is a reflective Liquid Crystal an Silicon (LCoS) microdisplay and the projector is part of a projection television.

72. The optical device according to claim 12, wherein retardation of the first and second substrates are greater than $2n\lambda$ by an amount of net retardation produced by the optical device at the target wavelength.

73. The optical device according to claim 72, wherein each substrate has at least $1\lambda$ retardation.

74. The optical device according to claim 12, wherein the optical device only has two retarder substrates.

75. The optical device according to claim 74, wherein retardations of the first and second substrates are greater then $2n\lambda$ by an amount of net retardation produced by the optical device.

76. The optical device according to claim 12, wherein the first substrate comprises a quartz.

77. The optical device according to claim 76, wherein the second substrate comprises a quartz waveplate having a thickness that results in a greater than $1\lambda$ retardation of light passing through the second substrate.

78. The optical device according to claim 12, wherein each of the first and second substrates comprise a quartz like waveplate having a thickness that produces at least $1\lambda$ retardation of light.

79. The optical device according to claim 30, wherein the combined value of the retardation of the first substrate and the retardation of the second substrate is greater than $2n\lambda$ by an amount of net retardation produced by the optical device at the target wavelength.

80. The optical device according to claim 79, wherein the first substrate comprises quartz having a thickness that produces $n\lambda$ retardation end the second substrate produces a in $(+\Delta)\lambda$ retardation, where $\Delta\lambda$ is the net retardation produced by the optical device.

81. The optical device according to claim 30, wherein each of the substrates comprise quartz.

82. The optical device according to claim 30, wherein at least one of the substrates comprises a quartz like material having a thickness that produces more than $1\lambda$ retardation of light.

* * * * *